United States Patent [19]

Nurmi

[11] Patent Number: 5,051,123
[45] Date of Patent: Sep. 24, 1991

[54] ARRANGEMENT FOR CLEANING SURFACES OF A WOOL CHAMBER IN THE MANUFACTURE OF MINERAL WOOL

[75] Inventor: Tom E. E. Nurmi, Pargas, Finland

[73] Assignee: Oy Partek AB, Pargas, Finland

[21] Appl. No.: 438,407

[22] PCT Filed: Jun. 13, 1988

[86] PCT No.: PCT/FI88/00095
§ 371 Date: Feb. 20, 1990
§ 102(e) Date: Feb. 20, 1990

[87] PCT Pub. No.: WO88/10242
PCT Pub. Date: Dec. 29, 1988

[30] Foreign Application Priority Data

Jun. 18, 1987 [FI] Finland .................................. 872747

[51] Int. Cl.$^5$ ............................................. C03B 37/04
[52] U.S. Cl. ................................... 65/9; 65/15; 65/4.4; 65/25.1; 65/27; 156/62.2
[58] Field of Search .................... 65/3.43, 3.44, 5–9, 65/4.4, 14–16, 25.1, 27, 26; 156/62.4, 62.2

[56] References Cited

U.S. PATENT DOCUMENTS 2,044,680 6/1936 Gilbert ................................. 65/21.3
2,707,690 5/1955 Pearson .............................. 65/4.4 X
3,190,737 6/1965 Schmidt .............................. 65/21.3
3,640,793 2/1972 Scott .................................. 156/62.2
4,894,081 1/1990 Neusy ............................. 65/21.3 X
4,904,292 2/1990 Neusy ................................ 65/21.3

Primary Examiner—Robert L. Lindsay
Attorney, Agent, or Firm—Cushman, Darby & Cushman

[57] ABSTRACT

An arrangement for cleaning a wool chamber in the manufacture of mineral wool. In the manufacture of mineral wood, a binder is added to the stream of fibres. The stream is deflected towards the wool chamber and the binder deposits itself in fine droplets on the fibres. The binder-loaded fibres which touch against the walls and roof of the wool chamber adhere to them, because the binder hardens upon contact with the hot surfaces. Gradually a hard deposit of binder and fibres is formed upon the walls. Cleaning of the walls is substantially simplified by making the walls and/or the roof of hollow, double-walled construction, perforating the inner walls, applying a reduced pressure in the cavity between the walls, and holding a detachable lining against the inner walls by suction. When the detachable lining has become coated with deposits of binder and fibres to a certain thickness, production is halted and the reduced pressure is broken off, whereon the detachable lining together with the deposits falls off and a new detachable lining is applied to the perforated walls.

11 Claims, 2 Drawing Sheets

ARRANGEMENT FOR CLEANING SURFACES OF A WOOL CHAMBER IN THE MANUFACTURE OF MINERAL WOOL

BACKGROUND OF THE INVENTION

The present invention relates to an arrangement for cleaning the inner surfaces of a wool chamber for the manufacture of mineral wool.

In the manufacture of mineral wool, a melt of mineral raw material is caused into run to a fibrillation unit. This can consist of a series of rapidly rotating cylinders on which the melt runs down over the peripheral surfaces and is thrown out by these and stretched during the formation of fibres. A directed stream of gas deflects the fibres into a wool chamber and deposits them on a collecting means, which can consist of a perforated conveyor belt or one or more perforated drums.

Alternatively, the fibrillation unit can consist of a rapidly rotating centrifugal receptacle with a perforated peripheral surface. The melt runs down into the centrifugal receptacle and is thrown out through the holes and converted into fibre. A stream of gas deflects the fibres to the wool chamber and deposits them on the collecting means.

A thermosetting binder is added to the stream of fibres in the wool chamber so that the fibres fasten to each other to form a mat of mineral wool.

The addition of the binder is the cause of a troublesome problem. The binder deposits itself as small sticky drops on the fibres and wads of wool, with the consequence that the fibres and wads of wool which touch against the walls of the wool chamber easily fasten to the walls as a result of the adhesive action of the binder. The binder hardens rapidly in the hot environment in the wool chamber and the material fastened onto the walls forms a rapidly growing hard coating. This coating must be removed before it becomes too thick, which means that about once a week the machines must be stopped for the sheet-steel walls to be scraped clean. The cleaning is a difficult and time-consuming task.

Hitherto, attempts have been made to reduce or eliminate this problem by bolting onto the walls of the wool chamber a replaceable lining of mineral wool. When the surface is scraped clean, the lining board of mineral wool splits readily and its outer layer comes off together with the deposits. When the lining boards have been thereby reduced to a certain thickness, they must be replaced.

Linings consisting of polytetrafluoroethylene sheets attached to the walls of the wool chamber by screws, clamps and other fastening elements have also been used. The task of cleaning the walls of the wool chamber when using such sheets is easier than when the walls are made of uncoated sheet steel, but these plastic sheets too, must be replaced regularly by new ones.

It is also known for the walls of the wool chamber to be made movable, so that during their movement from one side of the chamber to the other they are cleaned while outside the region of the wool chamber.

According to the published EP Application No. 194,605, an attempt is made to overcome the deposit problem by water-cooling the walls of the wool chamber. Owing to the lower temperature of the walls, the drops of binder do not harden on contact with the walls, but, instead, come off and end up on the receiving conveyor.

SUMMARY OF THE INVENTION

The object of the present invention is to simplify the cleaning of the internal wall surfaces of a wool chamber of a mineral wool manufacturing apparatus, and to avoid the use of water in contact with the walls of the wool chamber (The use of water is considered to be disadvantageous, because it involves problems e.g. from the point of view of corrosion).

In accordance with the principles of the present invention walls of the wool chamber are made as a double walled construction and the inner surface of the walls is perforated. Within the double walled construction, a reduced pressure has been arranged, with the aid of which a heat-resistant detachable lining is held fast against the inner wall by suction. When the lining has become coated with so much mineral wool that it is necessary to carry out cleaning, this is done simply by interrupting the reduced pressure in the double walls, where upon the lining comes off and can be readily gathered up. New lining can be simply applied in place after the reduced pressure has been re-applied.

The detachable lining is preferably made of metal, which can be aluminum foil or thin sheet metal. Polytetrafluoroethylene is also a suitable lining material. The detachable lining can also be a dense heat-resistant cloth, which possibly is coated with polytetrafluoroethylene or aluminum. The lining is suitably cut into pieces which are fitted to the shape of the inner surface walls of the wool chamber. It is then a simple matter to put the lining in place.

The reduced pressure is appropriately achieved by means of a suction fan, when the lining is flexible and the pressure reduction does not need to be so great. When the lining is made of stiffer material, e.g. thin sheet metal, a vacuum pump is used. Preferably, there should be a separate suction fan or vacuum pump, respectively, for the roof area of the wool chamber, and one for each side wall.

The pressure reduction in the walls should be considerably greater than that which normally prevails in the wool chamber, which is approx. 50–200 mm water column. The pressure reduction in the walls should therefore be preferably at least 500 mm water column.

It is also advantageous to divide the hollow roof and wall constructions into smaller sections and furnish them with safety systems which guarantee that the reduced pressure is maintained in other sections even if the perforated lining is damaged or comes loose in one of the sections of the wall or roof.

The shape and pattern of the perforations can vary. The holes can be circular, oval or rectangular, and the pattern of the holes can be chosen freely. The size of the holes shall not be greater than that used on the receiving conveyor of the wool chamber. (If some part of the detachable lining of the walls of the wool chamber were to become missing, some of the fibres from the stream of fibres will be drawn against the exposed holes and cover them. If the holes were too large, the fibres would be sucked through the holes and a continuous leakage of fibres would occur.) A combined hole area amounting to 20–60% of the total area is suitable.

When fibre manufacture is in progress, binder-coated fibres are continuously deposited on the lining-covered walls of the wool chamber. When the deposit has reached a certain thickness, production is halted and the reduced pressure in the walls of the wool chamber is broken off, whereon the detachable lining immediately comes off and falls down to the bottom of the wool chamber, from where it can readily be gathered up. The reduced pressure is then reconnected and clean lining sucked onto the walls of the wool chamber, after which production can be resumed. The lining should be changed about as often as the walls of the chamber are scraped clean today, i.e. about once a week. Compared with scraping clean, exchange of the detachable lining is considerably faster and simpler.

BRIEF DESCRIPTION OF THE DRAWINGS

In the following, the invention is described in greater detail with reference to the accompanying figures which illustrate two advantageous embodiments of the arrangement according to the invention, and in which.

DETAILED DESCRIPTION

Figure 1:
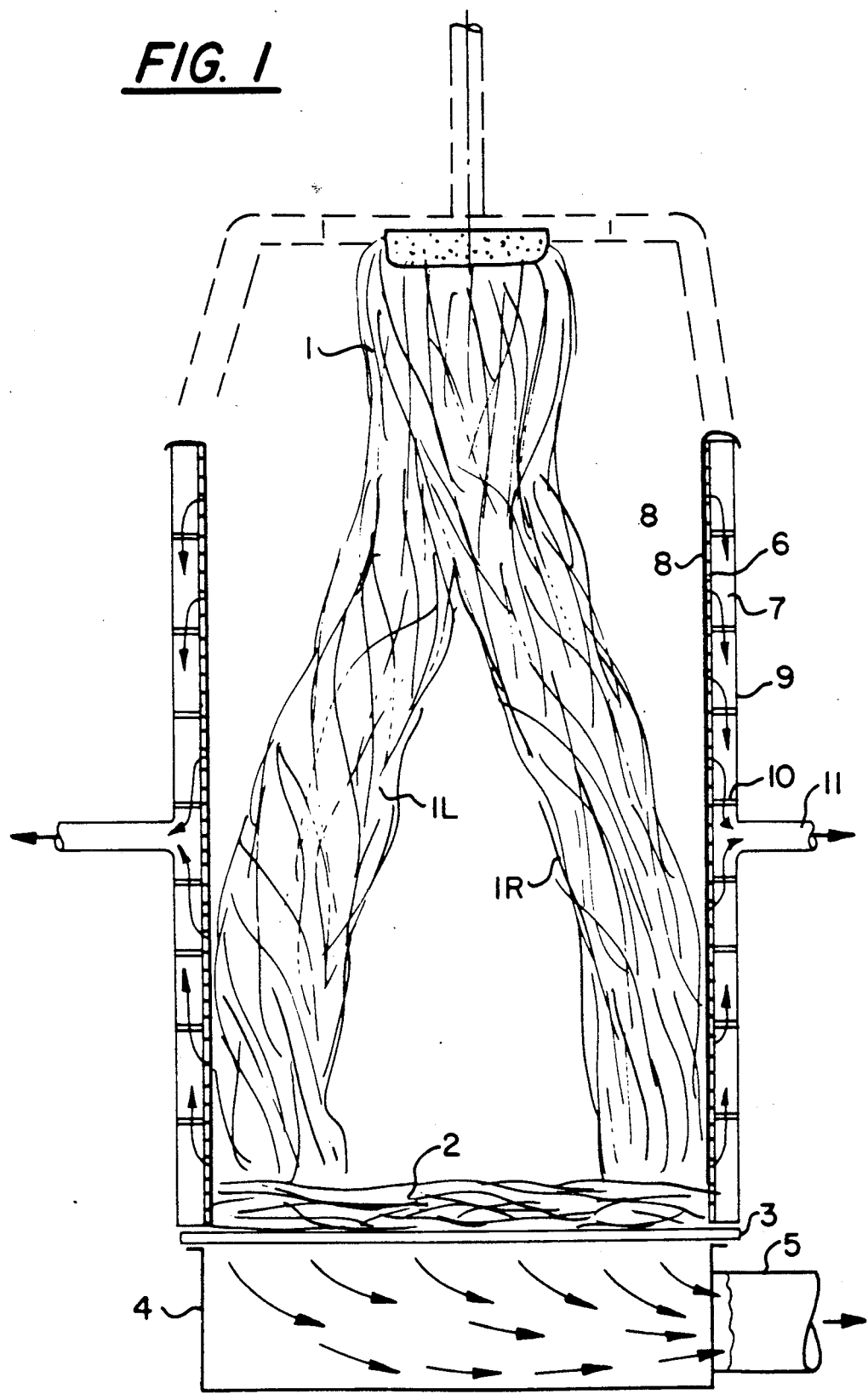
FIG. 1 shows a vertical cross-section of an arrangement according to the invention applied to a wool chamber for the manufacture of glass fibre.

In the figures, the reference number 1 denotes a stream of glass fibres or mineral fibres, the number 2 a collected fibre mat, and the number 3 a receiving conveyor on which the mat is formed. The number 4 denotes a suction box beneath the receiving conveyor and the number 5 an outlet for the stream of gas which is sucked out. The outlet is connected to the suction side of a fan, which is not shown. The number 6 denotes the inner perforated wall in a double wall construction, the number 7 the cavity space in between the inner and outer walls of the double-wall construction, the number 8 a detachable lining which is held against the inner wall by suction, and the number 9 the imperforate outer wall of the double wall construction. The number 10 denotes a spacing piece in the double wall, and the number 11 denotes one or more air outlets to one or more suction fans (not shown).

In the embodiment according to FIG. 1, the glass melt is thrown out through the holes in the fibrillation unit (shown at the top of the figure) and thereby converted into fibres in the wool chamber. A first gas stream stretches out the glass fibres 1 and subsequent directed gas streams guide the possibly oscillating fibre streams 1L and 1R (instantaneously the left and the right) towards the wool chamber and the receiving conveyor 3 on which the fibre mat 2 is formed. The addition of binder is not shown in the figure, but could be practiced, e.g., in a conventional manner. The vertical walls are constructed as double walls 6, 9 with a cavity 7 between them. The inner walls 6 are perforated and a detachable lining material 8 is held against them by suction. Particularly in the lower parts of the wool chamber, the outermost layer of the fibre streams comes into contact with the walls of the wool chamber and fastens onto the lining 8 on the inner walls. When the deposit on the lining 8 has reached a certain value, the detachable lining is replaced in the way described previously. The suction pressure is conducted through the outlets 11, which are connected to suction fans (not shown).

Figure 2:
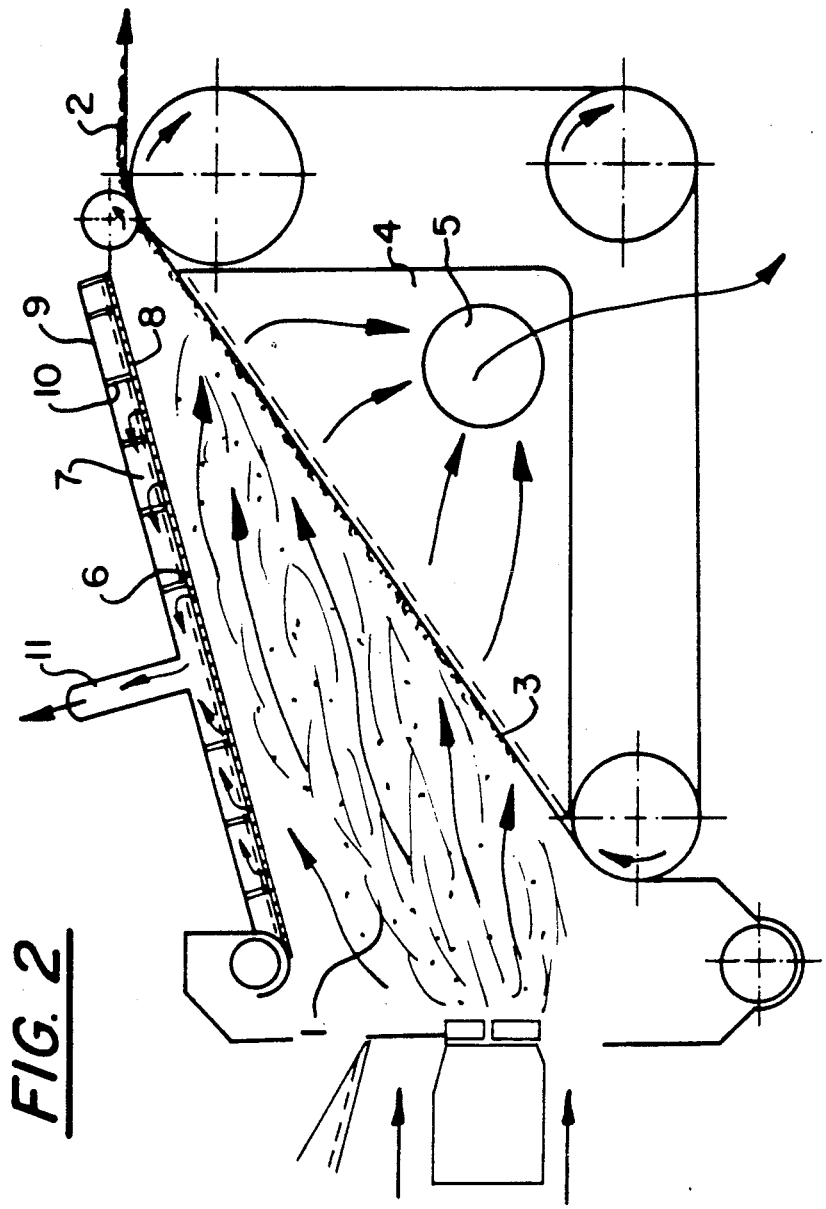
FIG. 2 shows a vertical cross-section of an arrangement according to the invention applied to a wool chamber for the manufacture of mineral wool.

In the embodiment according to FIG. 2, the mineral melt runs down onto a fibrillation unit consisting of rapidly rotating cylinders and strikes the peripheral surface of the first cylinder, from where the melt is thrown onto the peripheral surface of the next cylinder and simultaneously drawn out into fibres. A gas jet defects the fibre stream 1 against the upwardly inclined receiving conveyor 3. The reduced pressure in suction box 4 draws the fibre stream towards the receiving conveyor, which transports the fibre mat 2 formed to the following stage of production. The roof is of double construction and consists of an outer jacket 9 and a perforated inner surface 6, against which the detachable lining 8 is held fast by suction. The reduced pressure is achieved in the same manner as in the embodiment which has been described above with reference to FIG. 1. The side walls which are not shown in FIG. 2 are also of double construction and furnished with a lining in the same manner as in the wool chamber according to FIG. 1.

The outlet 11 can be furnished with non-return valves which prevent the ingress of air during momentary disturbances in the vacuum system. The double walls can be divided into sections and furnished with a safety system which guarantees that the reduced pressure is maintained in the other sections even if some part of the detachable lining is damaged or comes off. The spacing piece 10 has been introduced into the double walls to prevent the walls from collapsing as a consequence of the reduced pressure.

The suction fan, not shown, which creates the reduced pressure can be a suction fan or a vacuum pump. The choice of type depends on how great a reduction of pressure is needed in order to overcome the reduced pressure in the wool chamber and to hold the detachable lining in place. The pressure reduction in the wall constructions should be appreciably greater than the pressure reduction in the wool chamber since the latter affects the entire surface, i.e. the entire lining, whereas the pressure reduction in the walls affects only the perforated part, i.e. 20–50% of the surface. As noted earlier, the reduction of pressure in the wool chamber is normally between 50 and 200 mm water column, so that the reduction in pressure in the wall constructions should preferably be at least 500 mm water column. Flexible foil material is suitably held in place by suction fans and stiffer material by vacuum pumps.

Alternatively, one can contemplate facilitating cleaning of the wool chamber walls by means of applying an excess pressure in the double wall construction and producing a fluidizing layer adjacent to the inner wall, thus creating a repellent effect on the inner wall and thereby preventing loose fibres from depositing themselves on the inner wall.

I claim:

1. An apparatus for manufacturing fibrous wool from a melt of glass or mineral, in which the melt is streamed into glass or mineral wool fibres from a fibrillation unit opening into a wool chamber having a walls including a roof and side walls, and the fibres are deflected within the wool chamber by means of gas jets which, acting on the fibres, cause the fibres to deposit on a receiving conveyor which forms a floor for the wool chamber, an improvement for managing build up of the glass or mineral wool fibres on at least one of said walls of the wool chamber, said improvement comprising:

at least one of said walls of said wool chamber being provided as a double-walled construction including an outer wall which is spaced from an inner wall so as to provide at least one internal cavity, said inner wall having an inner surface arranged for exposure within said wool chamber;

a plurality of perforations formed through said inner wall thereby communicating said inner surface with a respective said cavity;

at least one source of suction, each communicated to a respective said cavity for drawing a vacuum through the respective said perforations; and at least one sheet of lining material removably held facewise on a respective portion of said inner surface by vacuum drawn through respective said perforations by the respective said source of suction, so that, in use of said apparatus, said lining material prevents said glass or mineral wool fibres from depositing directly on the respective portion of said inner surface, and, after said glass or mineral wool fibres have deposited on each said sheet of lining material to a substantial thickness, each sheet of lining material can be easily replaced by temporarily cutting off the respective said source of suction, thereby causing the respective sheet of lining material to detach from the inner wall of the wool chamber, replacing each thereby-detached sheet of lining material with a fresh one, and again turning on the respective source of suction.

2. The improved apparatus of claim 1, wherein:
said at least one of said walls is constituted by said side walls and said roof.

3. The improved apparatus of claim 1, wherein:
said at least one cavity is constituted by a plurality of cavities mutually separated into sections by divider means, each said section being communicated to a respective said source of suction.

4. The improved apparatus of claim 1, wherein:
said perforations together occupy approximately 20 to 60 percent of the area of a corresponding outer face of said at least one sheet of lining material.

5. The improved apparatus of claim 4, wherein:
said receiving conveyor is perforated by perforations and provided with means for drawing a suction therethrough for forming a mat of said fibres thereon; and said perforations through said inner wall have a hole size which is less than or equal to that of said perforations through said receiving conveyor.

6. The improved apparatus of claim 1, wherein:
at least one said sheet of lining material is made from aluminum foil.

7. The improved apparatus of claim 1, wherein:
at least one said sheet of lining material is made of sheet metal.

8. The improved apparatus of claim 1, wherein:
at least one said sheet of lining material is made of polytetrafluoroethylene.

9. The improved apparatus of claim 1, wherein:
at least one said sheet of lining material is made of heat-resistant cloth.

10. The improved apparatus of claim 9, wherein:
each said sheet of lining material made of cloth bears a coating of aluminum.

11. The improved apparatus of claim 9, wherein:
each said sheet of lining material made of cloth bears a coating of polytetrafluoroethylene.

* * * * *